P. KAMINSKI & O. SCHNEIDER.
ELECTRIC SIGNALING SYSTEM.
APPLICATION FILED JUNE 24, 1913.
1,215,815.
Patented Feb. 13, 1917.
2 SHEETS—SHEET 1.
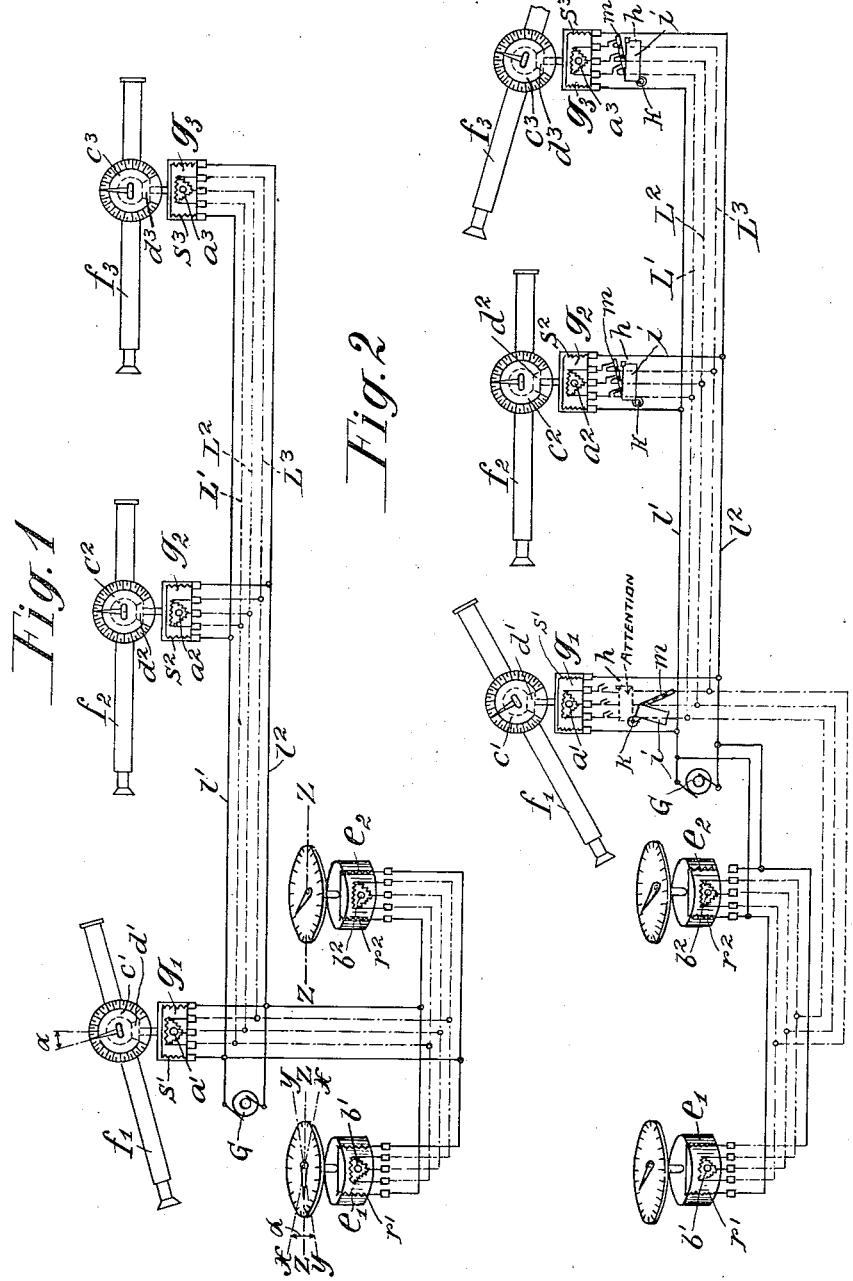
Witnesses:
Elsie Swenson
Ray J. Ernst.
Inventors
Paul Kaminski and Otto Schneider
by [signature]
Attorneys

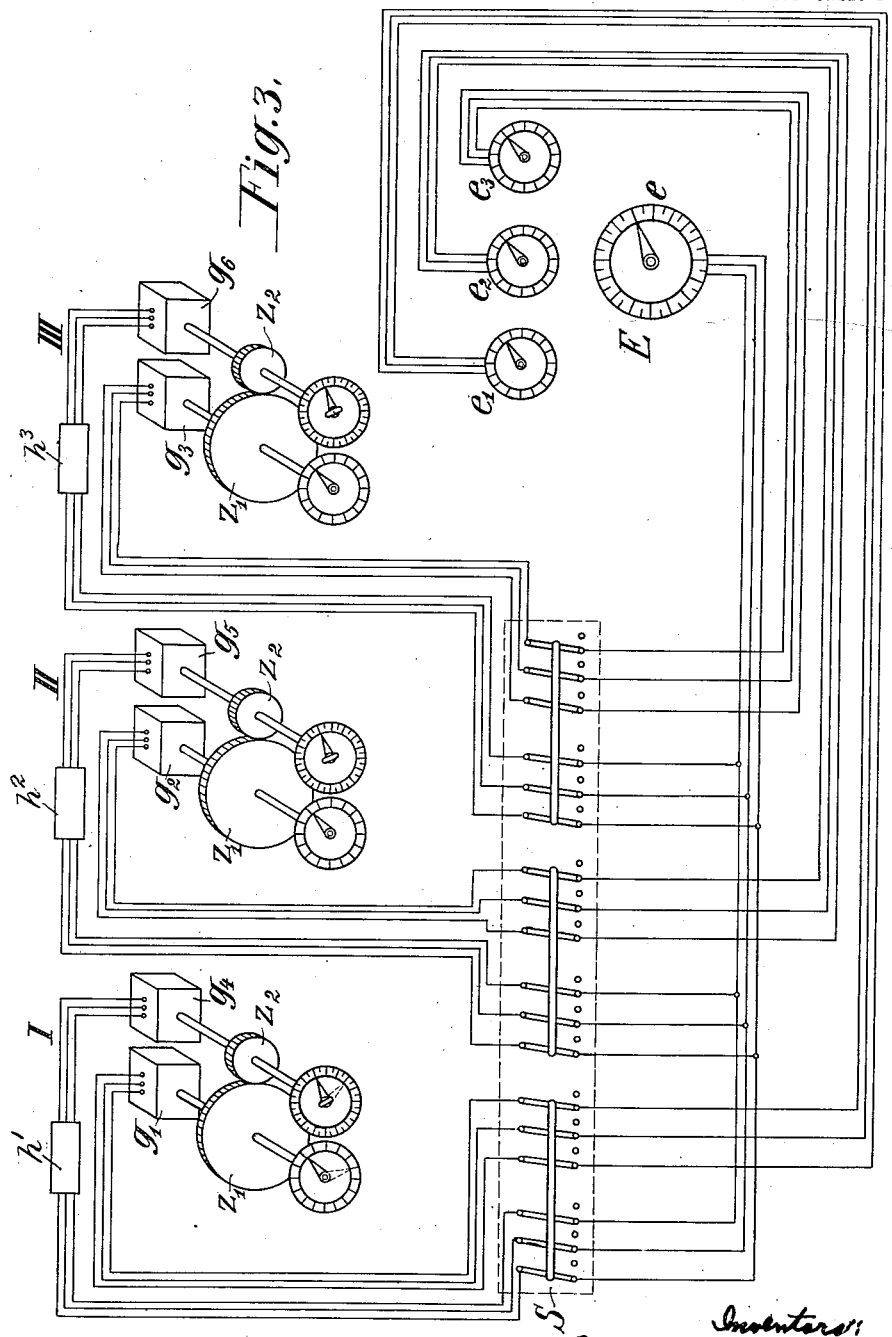

UNITED STATES PATENT OFFICE.

PAUL KAMINSKI, OF SPANDAU, AND OTTO SCHNEIDER, OF SCHÖNEBERG, NEAR BERLIN, GERMANY, ASSIGNORS TO SIEMENS & HALSKE, A. G., OF BERLIN, GERMANY, A CORPORATION OF GERMANY.

ELECTRIC SIGNALING SYSTEM.

1,215,815.     Specification of Letters Patent.     Patented Feb. 13, 1917.

Application filed June 24, 1913. Serial No. 775,495.

*To all whom it may concern:*

Be it known that we, PAUL KAMINSKI and OTTO SCHNEIDER, citizens of the German Empire, residing, respectively, at Spandau and Schöneberg, near Berlin, Germany, have invented certain new and useful Improvements in Electric Signaling Systems, of which the following is a specification.

Our invention relates to electric signaling systems for range finding or directing gun fire or similar purposes in which the angular position of an observing instrument is transmitted upon one or more sending systems. In such a system it is often advantageous to measure the direction or the distance of an object at several places simultaneously, for instance in case the distance of the object is very great, or in case the side-angle of the object has to be fixed with great accuracy. The measuring or observing at several places will thus be done by several observing instruments. These observing instruments, now, often cannot surpass a certain size, for instance upon vehicles, and in case the objects to be observed are at a greater distance, the instruments are subject to discrepancies in their indications, so that one is unable to determine which instrument is indicating the correct value. In order to obtain an approximately correct indication, therefore, a mean value of the several positions of the instruments is given by the present system, this mean value being taken for further calculation or transmitted to the sending system.

A main object of our invention is therefore to provide a system of this kind which shall comprise a plurality of senders, the position of these senders being simultaneously transmitted upon one or more receivers, so that the arithmetic mean of the positions of the senders will be indicated by the latter. For obtaining this result we have shown two modifications, one comprising the use of a common connecting line between said sender and the receiver or receivers, another consisting of separate connecting lines between the senders and the receivers.

Another object of our invention is to provide automatic means for indicating a position of a sender which is considerably at variance with the position of the others, or means for switching off or otherwise making ineffective such sender.

A further object of our invention, besides of the above mentioned plurality of senders, is to provide also a double system of receivers, of which one is designed to indicate said mean value of the positions of the senders, and the other to indicate the individual positions of each of said senders.

A still further object of our invention is to provide an electric signaling system consisting of two separate systems for coarse and fine adjustment and to indicate said average value by means of said system for fine adjustment, and the individual position of the several senders by means of said system for coarse adjustment.

Our invention will be more fully understood by referring to the accompanying drawings, of which Figure 1 diagrammatically shows an electric signaling system indicating the mean value of a plurality of sender positions by employing a common electrical circuit for all senders as well as receivers, Fig. 2 the same arrangement comprising automatic means for indicating a sender or senders which are in a position considerably differing from the average of the positions of the other senders, Fig. 3 shows a system comprising a fine and a coarse adjustment, as above pointed out. For the sake of clearness, in this figure the structure of the sending and receiving elements has not been shown in detail; for the same reason the exciting circuits, as well as the observing instruments and the annunciators have been omitted, these elements being substantially the same, as shown in Figs. 1 and 2.

Referring now more particularly to the drawing, in the arrangement of Figs. 1 and 2 there are shown three observing stations with instruments $f_1$, $f_2$, $f_3$. With the observing instruments $f_1$, $f_2$, $f_3$ are connected senders $g_1$, $g_2$, $g_3$, by means of bevel gears $c_1\ d_1$, $c_2\ d_2$, $c_3\ d_3$ respectively. The transmission of the angular positions of the observing instruments $f_1$, $f_2$, $f_3$ may be effected in any well known manner, preferably, by means of an alternating current system in which the armatures $a_1$, $a_2$, $a_3$ of the senders $g_1$, $g_2$, $g_3$ and the armatures $b_1$, $b_2$ of the receivers $e_1$, $e_2$ are rotatably arranged in similar alternating current fields $s_1$, $s_2$, $s_3$, $r_1$, $r_2$, respectively. The coils of the fields $s_1$, $s_2$, $s_3$ of the senders $g_1$, $g_2$, $g_3$ and the coils of the fields $r_1$, $r_2$ of the receivers $e_1$, $e_2$ are connected in parallel with the mains $l_1$, $l_2$ of an alternating current source G. The armatures $a_1$, $a_2$, $a_3$ of the senders $g_1$, $g_2$, $g_3$ and the armatures $b_1$, $b_2$ of the receivers $e_1$, $e_2$ are connected in parallel with the connecting lines $L_1$, $L_2$, $L_3$. By this arrangement the armatures hold each other in equilibrium so long as the armatures and the fields remain in the same angular positions relatively to each other. If, however, one of the armatures, for instance $s_1$ of the sender $g_1$, (see Fig. 1) is moved out of its symmetrical position equalizing currents are generated in the armature circuit which tend to move the armatures $b_1$, $b_2$ of the receivers $e_1$, $e_2$ to a corresponding angular position. According to the present invention the senders are all connected in parallel, and therefore act simultaneously upon the two receiving systems $e_1$ and $e_2$. As the sending systems are magnetically and electrically of even size, the receivers, if all three observing instruments are in the same position, will exactly indicate in the same manner, as if they were acted upon by a single sender apparatus being in this position.

If, however, an instrument, for instance, $f_1$ is in a position forming a certain angle with that of the others, two forces will act upon the receivers $e_1$ and $e_2$. The two senders $g_2$ and $g_3$ now tend to bring the receivers in the proper direction $x$, while the sender $g_1$ will tend to move the receivers into the direction $y$. The receivers, therefore, will be under the action of these two forces, and will assume a position coinciding with the direction of the resultant force $z$. Also, the two senders $g_2$ and $g_3$ being in the same position will act upon the receivers with a force which is practically twice that exerted by the sender $g_1$.

In most cases it will be desirable or necessary to transmit only positions of the observing instruments which fairly agree with each other and exclude observing instruments which are in an abnormally wrong position that is to say which are greatly at variance with respect to the others, because positions which agree approximately give sufficient guaranty that the exact value will lie between these limits.

According to this invention, now, instruments which are greatly differing from the others may be made ineffective in the following manner:—

Since the armatures of the several senders of the alternating current transmission system are connected as mentioned before in opposition to each other, no current will flow through the connecting line $L_1$, $L_2$, $L_3$, in case these several instruments are in the same angular position; if, however, a sender, for instance $g_1$ in Fig. 2, is in a position which is appreciably different from that of the other instruments, a current will flow through the connecting lines $L_1$, $L_2$, $L_3$, the strength of this current being dependent firstly upon the number of similarly, wrongly positioned instruments which act upon the sender and consequently, upon the angle by which this sender is displaced with respect to the others. If now suitable indicating means such as annunciators $h$ (Fig. 2) are provided and their sensitiveness is so chosen that they will respond at a definite angle of deflection, i. e. to a definite current flow in the connecting lines, then, upon surpassing this limit, said annunciators will come into action. Such annunciators, instead of merely giving indications, for instance by the signal word "Attention" such as is shown in Fig. 2, may be combined with switches and thus be adapted to open contacts by which a sender may be cut out, if it should be considerably at variance with the others. For this purpose the armature $i$ of each annunciator $h$ has connected to it a switch $m$ inserted in the armature circuit of its respective sender as shown in Fig. 2. In case the sender armature circuit carries a current beyond a predetermined value, the annunciator armature $i$ of that circuit drops and at the same time disconnects the armature from the connecting means $L_1$, $L_2$, $L_3$. Besides the word "Attention" or any other suitable signal word may appear. Thus, in the example shown, the armature $a_1$ of the sender $g_1$ which is in a position appreciably different from that of the other sender $g_1$, $g_3$, will be automatically cut off.

Any system may be employed as a transmitting system, also any number of receivers, senders or observing stations may be connected to the system so that the mean value of any desired multiplicity of quantities may be indicated at any desired number of stations.

The system as shown in Fig. 3 contains three observing and sending stations I, II, III from which the mean value shall be indicated at a receiving station E. In order to indicate the value with the greatest possible accuracy, the several sending stations are each equipped with two senders $g_1$, $g_4$, $g_2$, $g_5$ and $g_3$, $g_6$ of which the systems $g_1$, $g_2$, $g_3$ are designed for a coarse adjustment, and the systems $g_4$, $g_5$, $g_6$ for fine adjustment. In detail the construction of the sending and receiving apparatus as well as of the indicating means $h$ is assumed to be substantially the same as that shown in Figs. 1 and 2. The several pairs of sending systems accordingly are coupled with each other by a transmission gear $z_1$, $z_2$ in such a manner that the systems $g_1$, $g_2$, $g_3$ when passing through the whole measuring range make only one revolution, while the additional systems $g_4$, $g_5$, $g_6$ will make a number of revolutions which may be chosen as desired. The receiver station consists of the receiving systems $e_1$, $e_2$, $e_3$ and the system $e$, of which the latter serves for fine adjustment, and for indicating the mean value, while the former serve for the coarse adjustment, these systems being independent from each other as well as from the system $e$. The sender systems $g_1$, $g_2$, $g_3$ for coarse adjustment work each upon one of the receiver systems $e_1$, $e_2$, $e_3$, the sender systems $g_4$, $g_5$, $g_6$ for fine adjustment, however, work commonly upon the system $e$ of the receiver. It is desirable to provide a common switchboard or distributer S by means of which the several sending stations may be switched out or into circuit.

The operation of this arrangement is as follows: If the senders are moved according to the position of the several measuring instruments, the receiving systems $e_1$, $e_2$, $e_3$ will adjust themselves and assume a position corresponding to that of the sender systems $g_1$, $g_2$, $g_3$; in this manner the pointers which are connected to the receivers will assume a position according to the coarse adjustment of the sender systems. As the sender systems $g_4$, $g_5$, $g_6$ influence in common the fine adjustment of the receiver $e$, this latter will assume a mean position, resulting from the several positions of the sender systems for the fine adjustment.

If now any of the observing stations, for instance I is in a position which is largely different from that of the others, at first the pointers of the receivers $e_1$ will indicate this difference in position of the coarse adjustment, the system $e$ on the other hand according to the fine adjustment will indicate a mean value which is somewhat different.

If the difference in position which is indicated at the receiver $e_1$ surpass the permissible amount, then the corresponding sender with its two systems $g_1$, $g_4$ may be immediately switched off from the switchboard or distributer S, and therewith the action of the apparatus in a wrong position may be suppressed.

The connection of the receiver indicating the mean value of the positions of the observing instruments with the system of fine adjustment has the advantage of indicating the mean value with extreme accuracy. On the other hand the indications of the systems with coarse adjustment will suffice for properly indicating a wrong position of one of the observing instruments. The ratio of transmission between the systems of coarse and fine adjustment is preferably so chosen as to correspond to the desired accuracy of indicating the mean value, and the wrong positions of the observing instruments.

Having thus described our invention we wish to be understood as not limiting ourselves to the precise arrangements shown and described, since modifications may be made thereon without departing from the principle or sacrificing any of the advantages of this invention, we claim as new and desire to secure by Letters Patent of the United States:

1. In an electric signaling system, the combination with a common receiving apparatus, of a plurality of senders having any distance from each other and from said receiving apparatus, said receiver and senders having alternating current fields all energized from the same source, and having armatures rotatably arranged in said fields, electric connections between said sending and receiving apparatus, said sending and receiving apparatus being connected in multiple to said electric connections whereby the arithmetical mean value of the angular positions of said sender armatures is indicated on the receiver.

2. In an electric signaling system, the combination with a common receiving apparatus, of a plurality of senders, each having a sending element, said senders adapted to transmit the angular position of their respective sending element, and means comprised in said receiving apparatus for automatically indicating that a sending element is in a wrong position with respect to the others.

3. In an electric signaling system, the combination with a common receiving apparatus, of a plurality of senders each having a sending element, said senders adapted to transmit the angular position of their respective sending elements, an electric circuit including all said senders and said receiving apparatus, and means comprised in said receiving apparatus for automatically indicating that a sending element is in a wrong position with respect to the others.

4. In an electric signaling system, the combination with a common receiving apparatus, of a plurality of senders each having a sending element, said senders adapted to transmit the angular position of their respective sending elements, an electric circuit including all said senders and said receiving apparatus, means comprised in said receiving apparatus for automatically indicating that a sending element is in a wrong position with respect to the others, and means for rendering ineffective a sender having its sending element in the wrong position.

5. An electric signaling system consisting of a plurality of senders each comprising of a sending element for coarse and a sending element for fine adjustment, a receiving apparatus comprising a plurality of receiving elements connected by separate circuits to said sending elements for coarse adjustment and a receiving element connected by a common circuit to said sending elements for fine adjustment.

6. An electric signaling system consisting of a plurality of senders, each consisting of a sending element for coarse and a sending element for fine adjustment, a receiving apparatus comprising a plurality of receiving elements connected by separate circuits to said sending elements for coarse adjustment and a receiving element connected by a common circuit to all of said sending elements for fine adjustment, and means for automatically indicating that a sender is in a wrong position with respect to the others.

In testimony whereof we affix our signatures in presence of two witnesses.

PAUL KAMINSKI.
OTTO SCHNEIDER.

Witnesses:
WOLDEMAR HAUPT,
HENRY HASPER.